C. S. WALDO.
SECTIONAL WOODEN PIPE COVERING.
APPLICATION FILED SEPT. 30, 1918.
1,345,423.
Patented July 6, 1920.
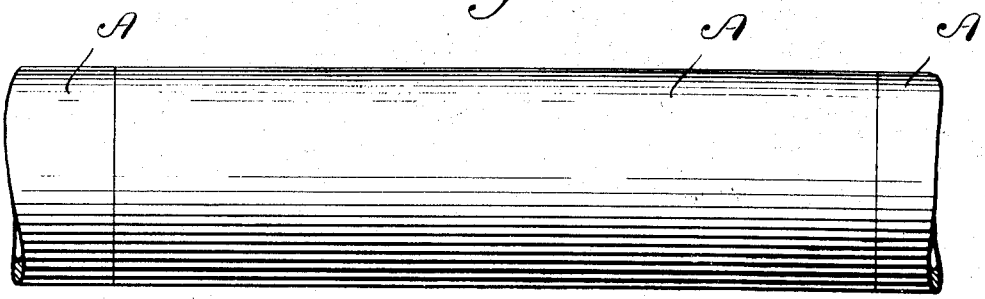
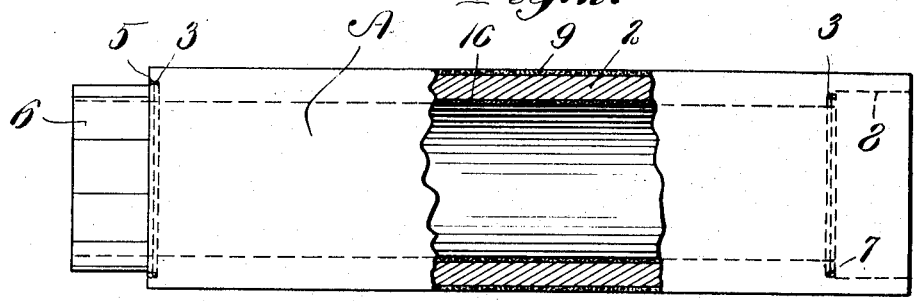
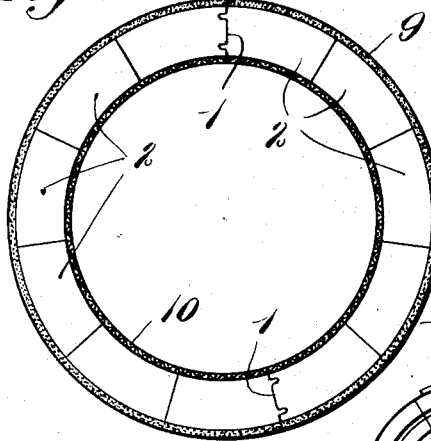
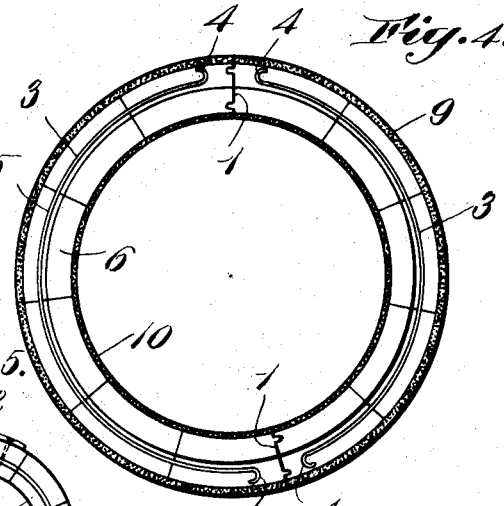
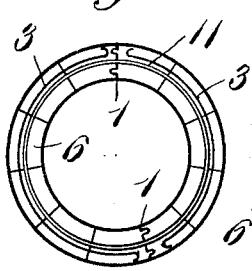
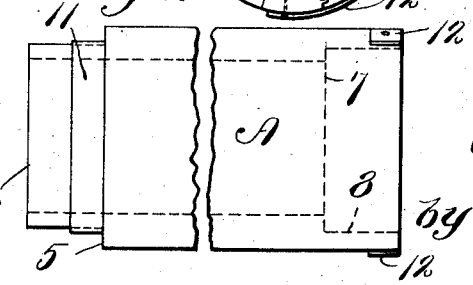
Inventor:
Charles S. Waldo
by Patrick, Patrick & Rushman
attys.

UNITED STATES PATENT OFFICE.

CHARLES S. WALDO, OF BROOKLINE, MASSACHUSETTS, ASSIGNOR TO WALDO BROTHERS, INCORPORATED, OF BOSTON, MASSACHUSETTS, A CORPORATION OF MASSACHUSETTS.

SECTIONAL WOODEN PIPE-COVERING.

1,345,423.  Specification of Letters Patent.  Patented July 6, 1920.

Application filed September 30, 1918. Serial No. 256,297.

*To all whom it may concern:*

Be it known that I, CHARLES S. WALDO, citizen of the United States of America, and resident of Brookline, in the county of Norfolk and State of Massachusetts, have invented new and useful Improvements in Sectional Wooden Pipe-Coverings, of which the following is a specification.

This invention relates to pipe coverings for heat insulation or other protection of piping of various kinds, and consists in the novel and improved sectional, tubular, wooden structure hereinafter described and pointed out in the claims.

In the accompanying drawings which illustrate a preferred embodiment of the invention, Figure 1 is a side elevation of the pipe covering showing several lengths, partly broken away, assembled end to end as they would be when applied to a pipe;

Fig. 2 is a side elevation, partly in longitudinal section, of a length of the pipe covering;

Fig. 3 is a cross section on an enlarged scale of the pipe covering;

Fig. 4 is an end elevation on an enlarged scale viewed from the left of Fig. 2, showing the tenon end;

Fig. 5 is an end elevation, viewed from the right of Fig. 2, showing the socket end;

Fig. 6 is an end view of the tenon end illustrating a temporary binder for holding the sections together for transportation or storage; and Fig. 7 is a side elevation, partly broken away, showing temporary binding means at both ends.

The complete, assembled, tubular, wooden pipe covering is made up of a series of lengths A of a diameter appropriate to the pipe to which it is to be applied, and of convenient length, placed end to end as shown in Fig. 1. Each length of pipe covering is divided lengthwise into two independent separable sections, so that the two parts may be placed around the pipe with their abutting edges forming closed joints 1, preferably rabbeted or provided with tongues and grooves to form a matched joint, as shown. Each such section is made up of a number of lengthwise extending wooden staves 2, the staves of each section being fastened together independently of the staves of the other section.

The preferred means for so fastening together the staves consists of a wire 3 which is driven into and embedded in the ends of the staves. The ends of the wire are bent or hooked, as shown at 4, to provide a firm anchorage for the wire to bind the several staves together.

In order that tightly closed end joints may be provided between successive lengths of the covering one end is made with an exterior shoulder 5 and tenon 6, and the other end with an interior shoulder 7 and socket 8 adapted to receive and fit the tenon of the next adjoining length of covering. The wire fastening 3 is embedded in these shoulders, and the hooks 4 face outwardly or inwardly according as they are embedded in the shoulders 5 or 7. Instead of wire, other fastening means such as metal strips could be sunk into the ends of wooden staves to bind them together, and such equivalent means are contemplated in the claims.

The exterior of each shell or section may be coated with any suitable waterproofing material 9, such as asphalt, or a similar waterproofing composition; and the interior may be covered with a heat insulating facing 10, such as wire mesh filled with asbestos cement. To make the continuous assembled structure completely waterproof a waterproofing cement may be applied to the tenon or socket, or both, before the lengths are fitted together end to end.

The structure is applied to the piping by merely placing the two sections around the piping with their edges 1 abutting, and binding them in place by suitable wires or bands extending around the outside of the covering.

To hold a pair of sections together temporarily for transportation or storage, a removable band or hoop 11 (Figs. 6 and 7) may be placed around the tenon 6, and a pair of straps 12 may be fastened to the opposite end across the joints between the two sections by means of easily removable nails or staples.

I claim:

1. Sectional wooden pipe covering formed of staves comprising means embedded in the ends of the staves of a section for fastening the staves of the section together transversely.

2. Sectional wooden pipe covering formed of staves and a wire embedded in the abutting ends of the staves of each section for fastening the staves of each section together.

3. Wooden pipe covering formed of staves, and a wire having hooked ends embedded in the ends of the staves for fastening the staves together.

4. Tubular wooden pipe covering divided lengthwise into a plurality of independent sections, each section comprising a number of staves, and means to fasten together transversely the staves of each section independently of the staves of another section, said means being embedded in the staves between their inner and outer surfaces.

5. Tubular wooden pipe covering divided lengthwise into a plurality of independent sections, each section comprising a number of staves and means embedded in the ends of the staves to fasten together the staves of each section independently of the staves of another section.

6. Tubular wooden pipe covering divided lengthwise into a plurality of independent sections, each section comprising a number of staves, and a wire embedded in the ends of the staves to fasten together the staves of each section independently of the staves of another section.

7. Wooden pipe covering formed of staves and having an exterior shoulder at one end and an interior shoulder at the other end, thus forming a tenon and socket at opposite ends, and a wire embedded in each shoulder for fastening the staves together.

Signed by me at Boston, Massachusetts, this twenty-sixth day of September, 1918.

CHARLES S. WALDO.